June 8, 1937.  A. H. HUNTER  2,083,299

DEVICE FOR HOLDING UTENSILS ON TABLES OR SIMILAR SURFACES

Filed Sept. 20, 1934

Inventor
Alfred H. Hunter
by
Atty.

Patented June 8, 1937

2,083,299

UNITED STATES PATENT OFFICE 2,083,299

DEVICE FOR HOLDING UTENSILS ON TABLES OR SIMILAR SURFACES

Alfred Henry Hunter, London, England

Application September 20, 1934, Serial No. 744,849
In Great Britain September 21, 1933

1 Claim. (Cl. 248—361)

This invention relates to a device for holding utensils such as basins, bowls, or the like on tables or similar surfaces.

In a large number of operations, domestic and otherwise, ingredients have to be stirred in a basin or like utensil during the introduction of further ingredients into said basin, and this operation presents difficulty, especially when the mixture is of a stiff nature, owing to the drag of the mixture being stirred pulling the basin round during the stirring.

One object of the present invention is to provide a device of simple construction which will hold a bowl or basin from turning on a table or like surface durnig stirring of ingredients in said basin.

A further object of the invention is to construct a holding device for a basin like utensil which grips the basin sufficiently to allow substances to be added to the utensil simultaneously with the stirring operation without the necessity of the operator holding the said utensil.

These and other objects of the invention will be apparent from the following description of certain embodiments thereof read in conjunction with the annexed drawing, wherein:—

Figure 1:
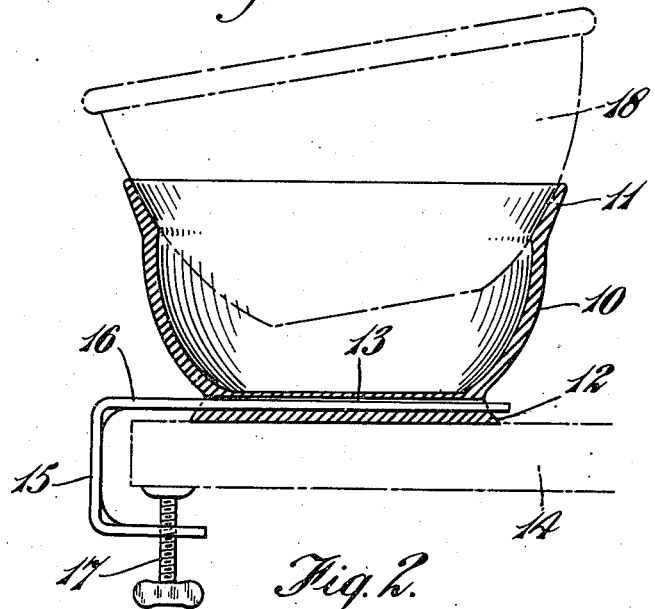
Figure 1 shows a vertical section through one embodiment of the invention.

Referring to Figure 1, 10 denotes a cup-like member preferably formed of rubber or similar flexible material having a friction exerting action. The member 10 of cup shape is formed at its upper edge with a tapering rim 11 for the purpose hereinafter described. At its base the member 10 is provided with a thickened portion 12 which may for example be constructed with a slot 13 extending diametrally through said base. The member 10 is adapted to be secured to a table or like surface 14 by means of a clamp of any suitable construction designated generally by 15 and provided with an arm 16 which extends within and engages the slot 13 and with a suitable clamping member 17.

The operation of the device illustrated in Figure 1 will be apparent therefrom. When a basin or similar device 18 is to be utilized for mixing substances or any other operation requiring stirring the basin is introduced into the member 10 at any convenient angle so that the basin is disposed with its axis vertical or inclined to the vertical, the basin 18 in the illustrated embodiment being somewhat inclined. Owing to the nature of the material of which the member 10 is formed and the construction of the tapering rim 11 a basin placed thereon in the manner indicated in the figure is gripped to a sufficient degree to prevent any rotation of the basin during stirring of ingredients therein whatever the consistency or viscosity of the said ingredients. In view of the form of the member 10 basins or similar utensils of different sizes may be held by one and the same member.

It is to be understood that the details of construction of the member 10 may well be varied without exceeding the scope of the invention. For example, the shape of the member 10 may be somewhat modified while the slot 13 need not necessarily extend the whole way through the base 12, while further, any suitable form of clamping device may be utilized, providing it is adapted to secure the member 10 to a table or similar surface. Further, the position of the slot or recess 12 may well be modified within the scope of the invention.

Figure 2:
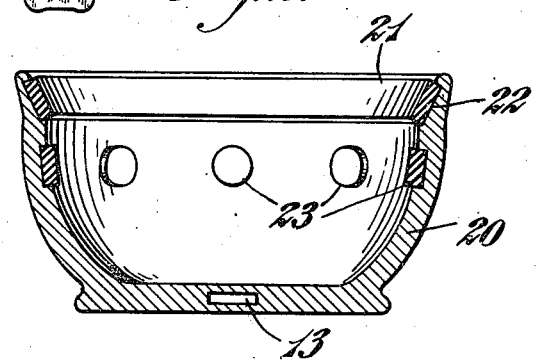
Figure 2 shows a corresponding section of a modified embodiment.

Referring to Figure 2 a somewhat modified embodiment of the invention is described which comprises a cup-shaped element 20 of any suitable material such as metal or synthetic resin which is provided in parts with a lining of friction exerting material such as rubber. In the embodiment illustrated in Figure 2 the member 20 of relatively rigid material is provided with a lining sleeve 21 which engages with the recess 22 formed in the tapering rim of the member 20 and further with a plurality of studs or projections 23 disposed below the sleeve 21. It is obvious that instead of the studs 23 disposed in the form of an annulus on the internal face of the member 20 a further lining sleeve may be provided forming a complete annulus in the same way as the sleeve 21. Alternatively, instead of the sleeve 21 disposed around the tapered rim of the member 20 a plurality of studs such as the studs 23 may be employed. The member 20 similarly to the member 10 of Figure 1 is provided with a slot 13 adapted to receive the arm of a clamping device or the like.

Figure 3:
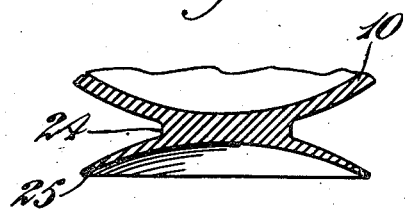
Figure 3 shows in section part of a modified construction.

In certain cases it may be sufficient to hold the member 10 of Figure 1 by means of a suction element without the employment of the clamping arrangement 15, 16, 17. In Figure 3 an embodiment of this nature is illustrated which comprises a cup member 10 formed with a base 24 which at its lower face is provided with an outwardly extending flange member 25 which is hollowed out to form a suction element in known manner. The application of the member 25 to a table or similar surface may secure the member 10 sufficiently for the purpose in view.

While the invention has been described in its application to holding basins or similar utensils it is of course obvious and within the scope of the invention that it may be used for holding other utensils such as crucibles, mortars, or the like and will be of considerable utility in laboratories and dispensaries.

If desired, the active face of the tapered rim 11 may be somewhat roughened to increase the frictional action of the said rim on the utensil being held.

What I claim is:—

A holding device for basin-like utensils comprising a bowl-shaped container open at its upper end and formed with an outwardly flared upper edge to provide a surface receiving and supporting the utensil at varying angles, the upper portion at least of said container being formed of rubber to provide a friction grip on the inserted utensil and a base forming part of said container and designed to provide for securing the container to a support.

ALFRED H. HUNTER.